United States Patent
Sanner et al.

(10) Patent No.: US 7,122,509 B2
(45) Date of Patent: Oct. 17, 2006

(54) HIGH TEMPERATURE FOAMER FORMULATIONS FOR DOWNHOLE INJECTION

(75) Inventors: J. Todd Sanner, Duncan, OK (US); Glenn S. Penny, Lakewood, CO (US); Roger Padgham, Marlow, OK (US)

(73) Assignee: CESI, A Flotek Company, Marlow, OK (US)

( * ) Notice: Subject to any disclaimer, the term of this patent is extended or adjusted under 35 U.S.C. 154(b) by 0 days.

(21) Appl. No.: 11/102,137

(22) Filed: Apr. 8, 2005

(65) Prior Publication Data

US 2005/0267007 A1 Dec. 1, 2005

Related U.S. Application Data

(60) Provisional application No. 60/578,173, filed on Jun. 8, 2004, provisional application No. 60/561,137, filed on Apr. 8, 2004.

(51) Int. Cl.
| | |
|---|---|
| *C11D 1/94* | (2006.01) |
| *C11D 1/29* | (2006.01) |
| *C11D 3/30* | (2006.01) |
| *C11D 7/36* | (2006.01) |
| *C11D 3/44* | (2006.01) |

(52) U.S. Cl. .................. 510/188; 510/237; 510/426; 510/432; 510/433; 510/467; 510/490; 510/495

(58) Field of Classification Search ............. 510/188, 510/237, 426, 432, 433, 490, 495, 467
See application file for complete search history.

(56) References Cited

U.S. PATENT DOCUMENTS

| 3,799,263 A | * | 3/1974 | Prillieux et al. ........... 166/275 |
|---|---|---|---|
| 3,861,466 A | * | 1/1975 | Gale ...................... 166/270.1 |
| 3,885,626 A | * | 5/1975 | Gale et al. ............... 166/270.1 |
| 3,885,628 A | * | 5/1975 | Reed et al. .............. 166/252.1 |
| 3,954,646 A | * | 5/1976 | Dewar et al. ............... 510/383 |
| 3,963,649 A | * | 6/1976 | Spadini et al. ............. 510/236 |
| 3,994,342 A | * | 11/1976 | Healy et al. ............. 166/270.1 |
| 4,661,288 A | * | 4/1987 | Rubingh et al. ............ 510/352 |
| 4,959,409 A | * | 9/1990 | Heinzman et al. ............ 525/61 |
| 5,527,487 A | * | 6/1996 | Mikkelsen et al. .......... 510/393 |
| 5,710,227 A | * | 1/1998 | Freeman et al. ............ 526/208 |
| 5,981,466 A | * | 11/1999 | Morelli et al. ............. 510/499 |
| 6,046,146 A | * | 4/2000 | Erilli ..................... 510/130 |
| 6,063,738 A | | 5/2000 | Chatterji et al. |
| 6,258,771 B1 | * | 7/2001 | Hsu et al. ................. 510/418 |
| 6,262,003 B1 | * | 7/2001 | Leonard et al. ............ 510/238 |
| 6,302,209 B1 | * | 10/2001 | Thompson et al. ....... 166/305.1 |
| 6,491,933 B1 | * | 12/2002 | Lorenzi et al. ............. 424/401 |
| 6,668,927 B1 | | 12/2003 | Chatterji et al. |
| 6,715,553 B1 | | 4/2004 | Reddy et al. |
| 6,767,867 B1 | | 7/2004 | Chatterji et al. |
| 2006/0063777 A1 | * | 3/2006 | Perry .................... 514/254.07 |

* cited by examiner

*Primary Examiner*—Charles Boyer
(74) *Attorney, Agent, or Firm*—Crowe & Dunlevy, P.C.

(57) ABSTRACT

Disclosed is a process for preparing a foamer composition having an anionic surfactant and a neutralizing amine. The process includes the steps of estimating an extent to which the anionic surfactant will decompose into acidic components under an elevated temperature range, determining an effective amount of neutralizing amine needed to sufficiently neutralize the acidic components upon the decomposition of the anionic surfactant and mixing the effective amount of neutralizing amine with the anionic surfactant. Also disclosed is a foamer composition having from about 5% to about 70% by weight anionic surfactant, from about 1% to about 20% by weight neutralizing amine, from about 2% to about 10% by weight amine-based corrosion inhibitor, from about 0% to about 20% by weight solvent, from about 1% to about 10% by weight scale inhibitor and from about 0% to about 30% water.

9 Claims, No Drawings

HIGH TEMPERATURE FOAMER FORMULATIONS FOR DOWNHOLE INJECTION

RELATED APPLICATIONS

This application claims the benefit of U.S. Provisional Patent Application No. 60/561,137, filed Apr. 8, 2004, entitled Stabilized Foamer Formulations For Downhole Injection, and U.S. Provisional Patent Application No. 60/578,173, Jun. 8, 2004, entitled Alpha Olefin Sulfonate Based Stabilized Foamer Solutions, the disclosures of which are incorporated herein.

FIELD OF THE INVENTION

The present invention is generally related to the treatment of oil and gas wells. One suitable application of the present invention is related to the treatment compositions that can be used to increase the production of marginally producing natural gas wells.

BACKGROUND OF THE INVENTION

As petroleum products are drained from subterranean formations, the reservoir energy gradually decreases. In some cases, the reduced reservoir pressure allows water to accumulate and "load" the well. Gas wells that are loaded with water tend to produce poorly in intermittent slug flow or cease to produce at all.

Artificial lift and stimulation procedures are often used to increase production from a loaded well. Chemical additives are often used to unload, or "de-water" the well. In recent years, it has become popular to inject "foamer" solutions down a capillary string to aid in the unloading of water accumulated in the wellbore. As gas passes through the foamer and water mixture, bubbles form and lift the water from the well. Foamers, or "soaps," typically include a surfactant component that reduces the surface tension and fluid density of the water-well fluid mixture in the wellbore.

SUMMARY OF THE INVENTION

In a preferred embodiment, the present invention includes a process for preparing a roamer composition having an anionic surfactant and a neutralizing amine. The process includes the steps of estimating an extent to which the anionic surfactant will decompose into acidic components under an elevated temperature range, determining an effective amount of neutralizing amine needed to sufficiently neutralize the acidic components upon the decomposition of the anionic surfactant and mixing the effective amount of neutralizing amine with the anionic surfactant.

In another aspect, the present invention includes a foamer composition having from about 5% to about 70% by weight anionic surfactant, from about 1% to about 20% by weight neutralizing amine, from about 2% to about 10% by weight amine-based corrosion inhibitor, from about 0% to about 20% by weight solvent, from about 1% to about 10% by weight scale inhibitor and from about 0% to about 30% water.

DETAILED DESCRIPTION OF PREFERRED EMBODIMENTS

In accordance with a presently preferred embodiment, a foamer composition includes an anionic surfactant. Suitable anionic surfactants include alcohol ether sulfates, alcohol sulfates and alpha-olefin sulphonates. In a particularly preferred embodiment, the anionic surfactant is a C8–C12 alcohol ether sulfate with 0 to 5 moles of ethylene oxide (EO), a C8–C16 alpha-olefin sulfonate or some combination therebetween.

While advantageous for their foaming properties and economy, it has been discovered that the preferred anionic surfactants decompose at elevated temperatures into acidic constituents, such as sulfuric acid, that can be corrosive and harmful to downhole equipment. The extent to which the selected anionic surfactant decomposes into acidic constituents has been correlated with downhole temperature and initial acidity.

To reduce thermal decomposition and to mitigate the adverse effects caused by the disassociation of the anionic surfactant, a neutralizing amine is added to the foamer composition of the preferred embodiments. The neutralizing amine is a primary amine, a secondary amine, a tertiary amine, an ethoxylated amine or an amidoamine. Presently preferred neutralizing amines include ammonia, methylamine, diethanolamine or triethanolamine, dimethylaminopropylamine, diethylenetriamine, triethylenetetratamine, hexamethylenediaminetetra, ethoxylated rosin amine D and cocoamidopropylbetaine. In a particularly preferred embodiment, the neutralizing amine is triethanolamine.

Unlike foamers of the prior art, which may include corrosion inhibitors formulated to mitigate the effects of the corrosive naturally occurring downhole environment, the neutralizing amines of the foamer compositions of the preferred embodiments are formulated to account for the corrosive components generated by the thermal decomposition of the included anionic surfactants.

In a presently preferred embodiment, the amount of neutralizing amine needed for a particular formulation or application can be determined using the following process. An initial amount of neutralizing amine can be added to the anionic surfactant based on stoichiometric analysis. In preferred embodiments, the initial quantity of neutralizing amine added to the anionic surfactant in a molar ratio of 0.5 to 1.0 moles of neutralizing amine to each mole of anionic surfactant. To ensure that the foamer composition is stabilized, a pilot test is preferably run over a selected period of time, perhaps 12–36 hours, in a high-pressure container at a selected temperature. At the conclusion of the pilot test, the pH of the composition is measured to determine the effectiveness of the neutralizing amine and the extent to which the anionic surfactant decomposed into acidic constituents. It is preferred that the foamer composition have a pH of greater than 7.0 at the conclusion of the pilot test. If the pH of the foamer composition is less than 7.0 at the conclusion of the pilot test, the initial quantity of neutralizing amine is increased and the test is repeated. This process is repeated until the foamer composition has a pH of greater than 7.0 at the conclusion of the preceding pilot test. The total amount of neutralizing amine is then recorded as an "effective amount" for the given anionic surfactant at the tested temperature and pressure.

In particularly preferred embodiments, a sufficient quantity of the selected neutralizing amine is added to the anionic surfactant to raise the pH of the foamer composition to above about 8. By starting at an alkaline pH, the neutralizing amine performs a buffering function by reducing the rate of disassociation of hydrogen ions from the anionic surfactant during thermal decomposition. As decomposition occurs, hydrogen ions released from the anionic surfactant are consumed by the neutralizing amine. In this sense, the roamer compositions of the preferred embodiments are formulated to accommodate the breakdown of the anionic surfactant in situ and are therefore capable of elongated exposure to elevated temperatures.

For example, the Table 1 below demonstrates the advantageous effects provided by the combination of the neutralizing amine with a selected anionic surfactant to produce a high temperature foamer composition.

TABLE 1

High Temperature Test

| Foamer Formula | Test Temperature (° F.) | Test Time (hrs) | Post-Heat (pH) |
|---|---|---|---|
| I | 350 | 24 | <1.0 |
| II | 350 | 24 | 8–9 |
| I | 400 | 24 | <1.0 |
| II | 400 | 24 | 7–8 |

Foamer Formula I is an alpha-olefin sulfonate (AOS). Foamer Formula II is the same alpha-olefin sulfonate (AOS) with the addition of triethanolamine (TEA) in a molar ration of 0.5 moles of TEA to each mole of AOS. The results of the High Temperature Test shown in Table 1 clearly demonstrate the advantages of combining an anionic surfactant (AOS) with an effective amount of a neutralizing amine (TEA). At both test temperatures, Post-Heat pH of Formula II was above 7.0 after a 24 hour exposure to elevated temperatures. At the conclusion of the High Temperature Test, the foamer composition of Formula I had decomposed into highly acidic constituents.

The roamer composition can optionally include a solvent. The use of a solvent increases foam height, lowers the freezing point of the foamer and improves mixing between various components. Preferably, the solvent is a primary, secondary or tertiary alcohol having between 1 and 8 carbon atoms. In a particularly preferred embodiment, the solvent is isopropyl alcohol. In an alternatively preferred embodiment, the solvent is a mutual solvent, such as ethyleneglycol-monobutyl ether (EGMBE).

The foamer composition can optionally include an amine-based corrosion inhibitor to protect downhole equipment from the corrosive wellbore environment. Preferred amine-based corrosion inhibitors include amidoamines, quaternary amines and amides. In an alternate preferred embodiment, the amine-based corrosion inhibitor is ethoxylated rosin amine D. The foamer composition can also include a scale inhibitor. Preferred scale inhibitors include polyanionics, such as polyphosphates, polyphosphonates and phosphate esters. In a particularly preferred embodiment, the scale inhibitor is HDMTMP hexamethylene diamine tetra(methylene phosphonic acid).

Preferably, each of the selected components in the foamer composition is mixed together before delivery to the well. As explained above, in a particularly preferred embodiment, the amount of neutralizing amine is preferably determined using a stoichiometric analysis and high-temperature pilot test. Based on this process, the desired amount of the neutralizing amine (the "effective amount") can be calculated. The effective amount of neutralizing amine can then be mixed with the anionic surfactant to provide a concentrated foamer composition. Solvents, corrosion inhibitors, scale inhibitors and water can also be mixed into the concentrated foamer composition. In a highly preferred embodiment, water is added to the concentrated foamer composition in a ratio of 7 to 9 parts of water to 1 part concentrated foamer composition to produce a diluted foamer composition.

In a preferred embodiment, the foamer composition is prepared with from about 5% to about 70% by weight anionic surfactant, from about 1% to about 20% by weight neutralizing amine, from about 0% to about 10% by weight amine-based corrosion inhibitor, from about 0% to about 20% by weight solvent, from about 0% to about 10% by weight scale inhibitor and from about 0% to about 30% water. The following examples provide presently preferred embodiments of the foamer composition. It will be understood that these examples are merely illustrative and are not to be considered limiting.

EXAMPLE 1

In a first preferred formulation, the foamer composition is prepared by combining from about 58% to about 60% by weight ether sulfate, from about 16% to about 20% by weight hydroxysultaine, from about 13% to about 15% by weight of ethyleneglycolmonobutyl ether (EGMBE), from about 2% to about 6% by weight of triethanolamine (TEA) and from about 3% to about 6% by weight hexamethylene diamine tetra (methylene phosphonic acid).

EXAMPLE 2

In a second preferred formulation, the foamer composition is prepared by combining from about 60% to about 64% by weight cocoimidopropylbetaine, from about 20% to about 25% by weight of alpha-olefin sulfonate (AOS), from about 5% to about 10% by weight ethyleneglycolmonobutyl ether (EGMBE), from about 1% to about 4% by weight Rosin Amine D, from about 1% to about 4% hexamethylene diamine tetra (methylene phosphonic acid) and from about 2% to about 6% by weight triethanolamine (TEA).

EXAMPLE 3

A third preferred formulation can be prepared by combining from about 5–70% by weight alcohol ether sulfate, about 1–20% by weight triethanolamine, about 0%–20% by weight isopropyl alcohol (IPA) and about 0–30% by weight water.

EXAMPLE 4

In a fourth preferred formulation, the foamer composition is prepared by combining about 5–50% by weight alcohol ether sulfate, about 1–10% by weight neutralizing amine, about 2–10% by weight ethoxylated rosin amine D, about 1–10% by weight hexamethylene diamine tetra (methylene phosphonic acid); about 0–20% by weight ethyleneglycol-monobutyl ether (EGMBE) and about 0–20% water.

EXAMPLE 5

In a fifth formulation for temperatures greater than about 250 F, the foamer composition is prepared by combining 5–70% alpha olefin sulfonate, about 1–20% amine, about 0–20% IPA and 0–30% water.

EXAMPLE 6

In a sixth formulation, the stabilized high temperature foamer is prepared by combining about 5–50% alpha-olefin sulfonate, about 1–10% triethanolamine, about 2–10% ethoxylated rosin amine D, about 1–10% hexamethylene diamine tetra (methylene phosphonic acid); about 0–20% ethyleneglycolmonobutyl ether (EGMBE) and about 0–20% water.

In a presently preferred embodiment, the foamer composition is delivered downhole through use of small-diameter, or capillary tubing. Although the foamer composition is useful in foam cleanout of watered-out oil and gas wells, the foamer composition can also be used in air-mist drilling, stable foam drilling, or foam fracturing.

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed and claimed herein.

The invention claimed is:

1. A well treatment composition comprising:
   from about 5% to about 70% by weight anionic surfactant, wherein the anionic surfactant is an alkyl ether sulfate;
   from about 1% to about 20% by weight neutralizing amine, wherein the neutralizing amine is triethanolamine (TEA);
   from about 1% to about 20% by weight solvent, wherein the solvent is ethyleneglycolmonobutyl ether (EGMBE); and
   from about 1% to about 10% by weight scale inhibitor, wherein the scale inhibitor is hexamethylene diamine tetra (methylene phosphonic acid).

2. The well treatment composition of claim 1 further comprising from about 2% to about 10% by weight amine-based corrosion inhibitor.

3. The well treatment composition of claim 2, wherein the amine-based corrosion inhibitor is Rosin Amine D.

4. The well treatment composition of claim 1, further comprising from about 16% to about 20% by weight hydroxysultaine.

5. The well treatment composition of claim 1, further comprising from about 0% to about 30% water.

6. A well treatment composition comprising:
   from about 5% to about 25% by weight anionic surfactant, wherein the surfactant is alpha-olefin sulfonate (AOS);
   from about 25% to about 70% by weight neutralizing amine, wherein the neutralizing amine is selected from the group consisting of cocoamidopropylbetaine and triethanolamine (TEA);
   from about 2% to about 10% by weight amine-based corrosion inhibitor;
   from about 1% to about 20% by weight solvent;
   from about 1% to about 10% by weight scale inhibitor; and
   from about 0% to about 30% water.

7. The well treatment composition of claim 6, wherein the amine-based corrosion inhibitor is selected from the group consisting of Rosin Amine D.

8. The well treatment composition of claim 6, wherein the solvent is ethyleneglycolmonobutyl ether (EGMBE).

9. The well treatment composition of claim 6, wherein the scale inhibitor is hexamethylene diamine tetra (methylene phosphonic acid).

* * * * *

UNITED STATES PATENT AND TRADEMARK OFFICE
CERTIFICATE OF CORRECTION

PATENT NO. : 7,122,509 B2
APPLICATION NO. : 11/102137
DATED : October 17, 2006
INVENTOR(S) : J. Todd Sanner et al.

It is certified that error appears in the above-identified patent and that said Letters Patent is hereby corrected as shown below:

Column 3, line 33, replace "The roamer" with --The foamer--.

Column 4, line 35, replace "Rosin Amine D" with --rosin amine D--.

Column 5, line 1, replace "1 10%" with --1-10%--; line 1, replace "2 10%" with --2-10%--; and line 4, replace "0 20%" with --0-20%--.

Column 6, line 5, replace "Rosin Amine" with --rosin amine D--; and line 26, replace "Rosin Amine D" with --rosin amine D--.

Signed and Sealed this

Sixth Day of March, 2007

JON W. DUDAS
*Director of the United States Patent and Trademark Office*